US012650826B2

(12) United States Patent
Urabe et al.

(10) Patent No.: US 12,650,826 B2
(45) Date of Patent: Jun. 9, 2026

(54) INFORMATION PROVIDING DEVICE, INFORMATION PROVIDING METHOD, INFORMATION MANAGEMENT DEVICE, AND COMPUTER-READABLE RECORDING MEDIUM

(71) Applicant: Yokogawa Electric Corporation, Tokyo (JP)

(72) Inventors: Hiroo Urabe, Tokyo (JP); Yusaku Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 273 days.

(21) Appl. No.: 18/236,083

(22) Filed: Aug. 21, 2023

(65) Prior Publication Data

US 2024/0078102 A1 Mar. 7, 2024

(30) Foreign Application Priority Data

Sep. 2, 2022 (JP) ................................. 2022-140211

(51) Int. Cl.
*G06F 8/61* (2018.01)
*G06F 11/36* (2025.01)

(52) U.S. Cl.
CPC ...................................... *G06F 8/61* (2013.01)

(58) Field of Classification Search
CPC ....................................................... G06F 8/61
See application file for complete search history.

(56) References Cited

U.S. PATENT DOCUMENTS

| | | | | |
|---|---|---|---|---|
| 2008/0281625 | A1* | 11/2008 | Shiki ........................ | G06F 21/10 726/19 |
| 2012/0047239 | A1* | 2/2012 | Donahue ............... | G06F 9/5072 709/220 |
| 2015/0065182 | A1* | 3/2015 | Adams .................... | H04W 4/12 455/466 |
| 2016/0132668 | A1* | 5/2016 | Shimogawa .............. | G06F 8/60 726/29 |
| 2022/0276901 | A1* | 9/2022 | Ravala .................... | G06F 11/00 |
| 2023/0101077 | A1 | 3/2023 | Nishioka et al. | |
| 2023/0305902 | A1 | 9/2023 | Sugisono et al. | |

FOREIGN PATENT DOCUMENTS

| | | |
|---|---|---|
| JP | 2022-50323 A | 3/2022 |
| WO | 2021192318 A1 | 9/2021 |
| WO | 2022044121 A1 | 3/2022 |

OTHER PUBLICATIONS

Japanese Office Action (JPOA) dated Mar. 11, 2025 issued in Japanese patent application No. 2022-140211 and its machine English translation.

(Continued)

*Primary Examiner* — S. Sough
*Assistant Examiner* — Mohammad H Kabir
(74) *Attorney, Agent, or Firm* — RANKIN, HILL & CLARK LLP

(57) ABSTRACT

An overall management server acquires a request to use an application from a first user, sets a management area where the application requested by the first user is built, and provides the requested application in the management area set for the first user.

17 Claims, 11 Drawing Sheets

(56)　　　　　　　References Cited

OTHER PUBLICATIONS

Extended European Search Report (EESR) dated Nov. 29, 2023 for European Patent Applicaiton No. 23193878.8.
Anonymous, "AWS Organizations User Guide", Aug. 16, 2022, XP093100560, Retrieved from the Internet: <URL:https://web. archive.org/web/20220816164434/https://docs.aws.amazon.com/ organizations/latest/userguide/organizations-userguide.pdf#orgs_ getting-started>, retrieved on Nov. 13, 2023, Total 364 pages, pp. 18-19, pp. 337, pp. 346; Cited in EESR.
Anonymous, "AWS License Manager User Guide", Jan. 19, 2022 (Jan. 19, 2022), XP093100543, Retrieved from the Internet: <URL:https://web.archive.org/web/20220119210037/https://docs. aws.amazon.com/license-manager/latest/userguide/license-manager. pdf#license-manager>, retrieved on Nov. 13, 2023, Total 68 pages, pp. 1, p. 33; Cited in EESR.
Japanese Office Action dated Jul. 8, 2025 issued for Japanese patent application No. 2022-140211 and its English machine translation.

* cited by examiner

CLOUD ENVIRONMENT (1) INSTALL WEB APPLICATION IN EACH MANAGEMENT AREA

Figure 1:
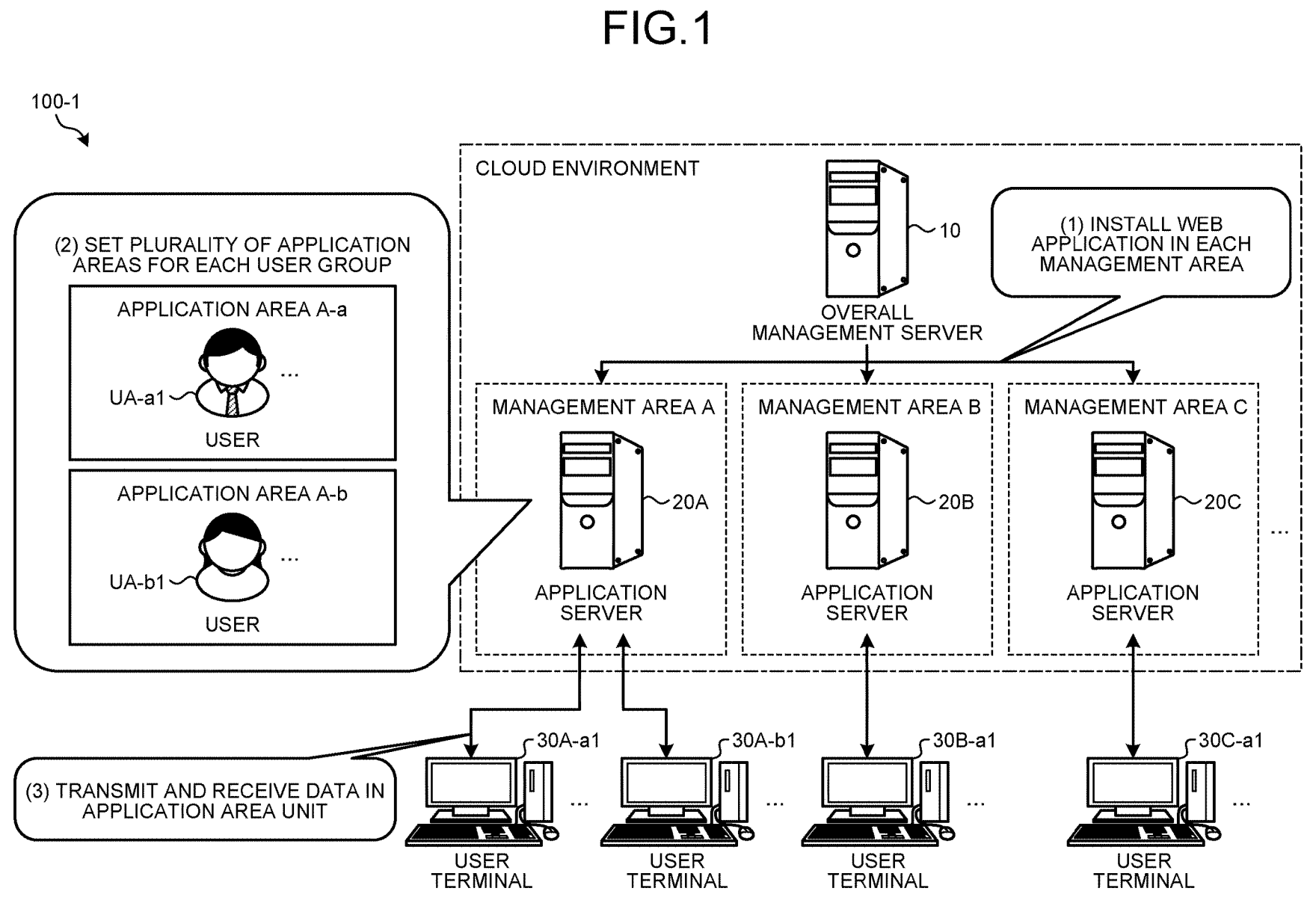

OVERALL MANAGEMENT SERVER

10

MANAGEMENT AREA C
APPLICATION SERVER
20C

MANAGEMENT AREA B
APPLICATION SERVER
20B

MANAGEMENT AREA A
APPLICATION SERVER
20A 30C-a1
USER TERMINAL 30B-a1
USER TERMINAL 30A-b1
USER TERMINAL 30A-a1
USER TERMINAL (2) SET PLURALITY OF APPLICATION AREAS FOR EACH USER GROUP

APPLICATION AREA A-a
USER
UA-a1

APPLICATION AREA A-b
USER
UA-b1

(3) TRANSMIT AND RECEIVE DATA IN APPLICATION AREA UNIT

| MANAGE-MENT AREA IDENTIFICA-TION INFOR-MATION | APPLICATION IDENTIFICATION INFORMATION | MANAGER LICENSE INFORMATION | MANAGER IDENTIFICA-TION INFOR-MATION | ... |
|---|---|---|---|---|
| MANAGE-MENT AREA A | APPLICATION A | ML-A001 | MID-A | ... |
| MANAGE-MENT AREA B | APPLICATION B | ML-B001 | MID-B | ... |
| MANAGE-MENT AREA C | APPLICATION C | ML-C001 | MID-C | ... |
| ... | ... | ... | ... | ... |

| APPLICATION IDENTIFICATION INFORMATION | APPLICATION AREA IDENTIFICATION INFORMATION | USE AUTHORITY | | | USER IDENTIFICATION INFORMATION | USER LICENSE INFORMATION | USER LOCATION INFORMATION | |
|---|---|---|---|---|---|---|---|---|
| | | NUMBER OF AVAILABLE SCREENS | NUMBER OF ALLOWED USERS | NUMBER OF ACCESSIBLE DATA | | | | |
| APPLICATION A | APPLICATION AREA a | THREE SCREENS | FIVE PEOPLE | 50 DATA | UID-a001 | UL-a001 | URL-a001 | ⋮ |
| | | | | | UID-a002 | UL-a002 | URL-a002 | ⋮ |
| | | | | | ⋮ | ⋮ | ⋮ | ⋮ |
| | APPLICATION AREA b | SIX SCREENS | TEN PEOPLE | 100 DATA | UID-b001 | UL-b001 | URL-b001 | ⋮ |
| | | | | | UID-b002 | UL-b002 | URL-b002 | ⋮ |
| | | | | | ⋮ | ⋮ | ⋮ | ⋮ |
| | ⋮ | ⋮ | ⋮ | ⋮ | ⋮ | ⋮ | ⋮ | ⋮ |

FIG.7

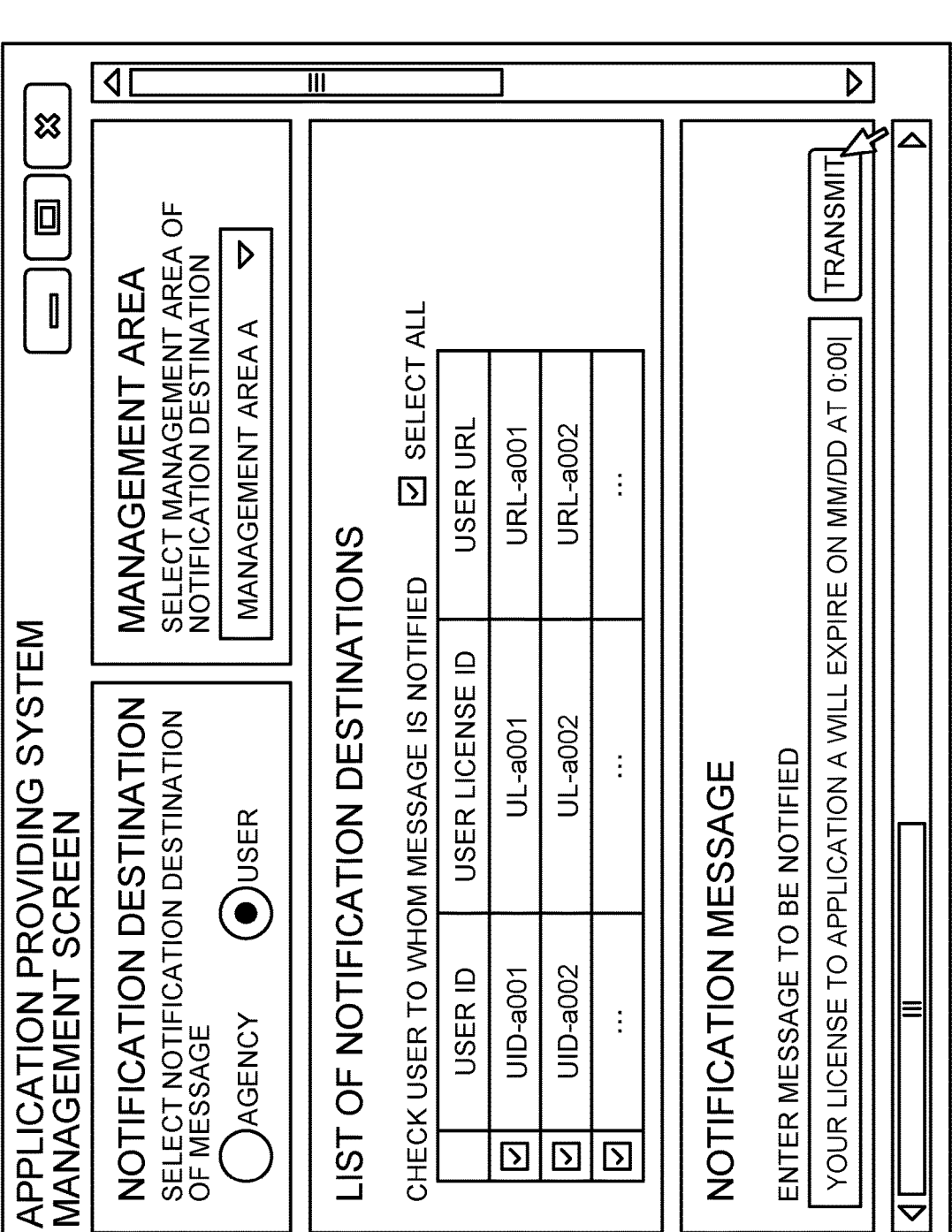

APPLICATION PROVIDING SYSTEM MANAGEMENT SCREEN

NOTIFICATION DESTINATION
SELECT NOTIFICATION DESTINATION OF MESSAGE

○ AGENCY    ● USER

MANAGEMENT AREA
SELECT MANAGEMENT AREA OF NOTIFICATION DESTINATION

MANAGEMENT AREA A ▽

LIST OF NOTIFICATION DESTINATIONS

CHECK USER TO WHOM MESSAGE IS NOTIFIED    ☑ SELECT ALL

| | USER ID | USER LICENSE ID | USER URL |
|---|---|---|---|
| ☑ | UID-a001 | UL-a001 | URL-a001 |
| ☑ | UID-a002 | UL-a002 | URL-a002 |
| ☑ | ... | ... | ... |

NOTIFICATION MESSAGE

ENTER MESSAGE TO BE NOTIFIED

YOUR LICENSE TO APPLICATION A WILL EXPIRE ON MM/DD AT 0:00|

TRANSMIT

FIG.8

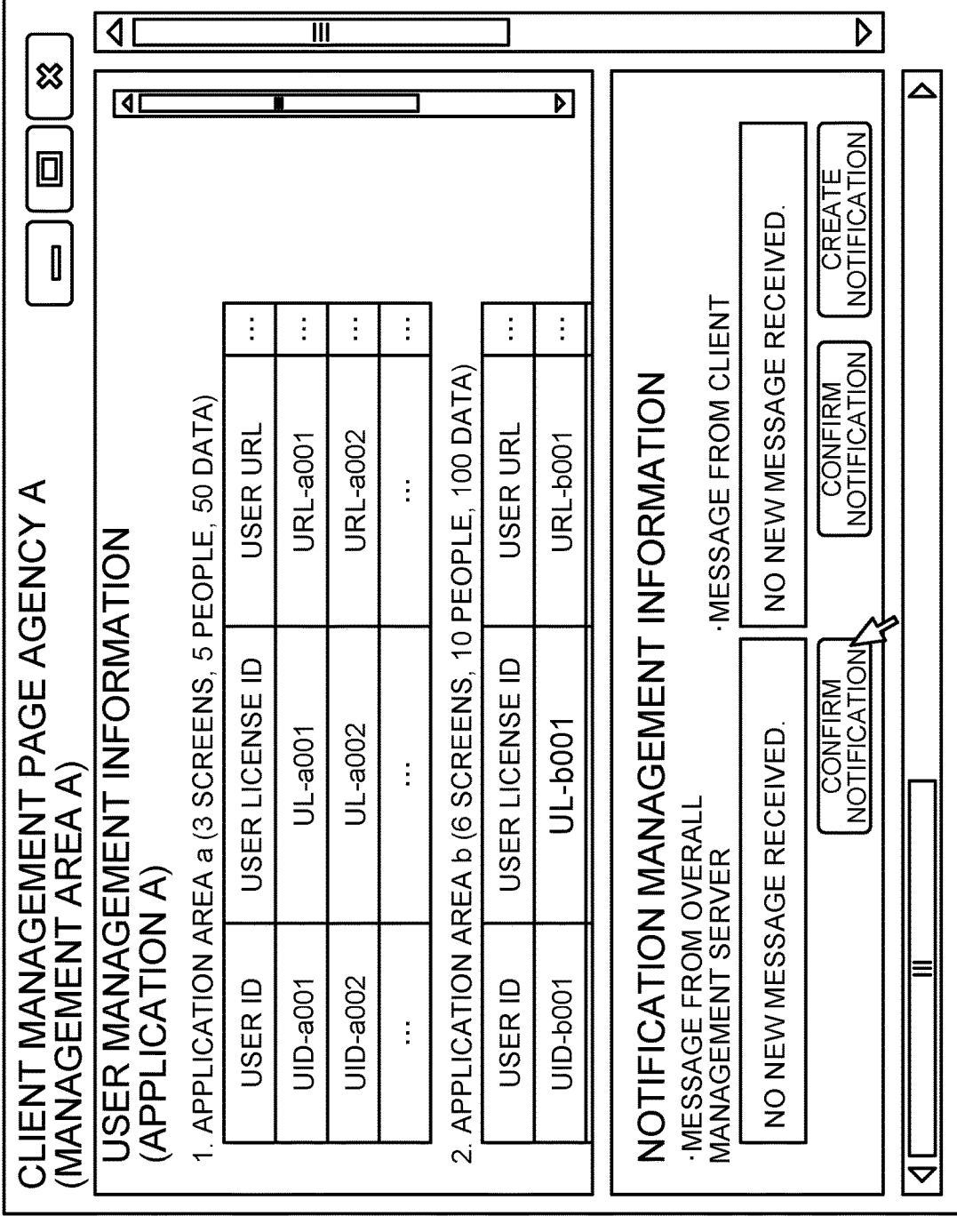

CLIENT MANAGEMENT PAGE AGENCY A
(MANAGEMENT AREA A)

USER MANAGEMENT INFORMATION
(APPLICATION A)

1. APPLICATION AREA a (3 SCREENS, 5 PEOPLE, 50 DATA)

| USER ID | USER LICENSE ID | USER URL | |
|---------|-----------------|----------|---|
| UID-a001 | UL-a001 | URL-a001 | ⋮ |
| UID-a002 | UL-a002 | URL-a002 | ⋮ |
| ⋮ | ⋮ | ⋮ | ⋮ |

2. APPLICATION AREA b (6 SCREENS, 10 PEOPLE, 100 DATA)

| USER ID | USER LICENSE ID | USER URL | |
|---------|-----------------|----------|---|
| UID-b001 | UL-b001 | URL-b001 | ⋮ |
| | | ⋮ | ⋮ |

NOTIFICATION MANAGEMENT INFORMATION

·MESSAGE FROM OVERALL
MANAGEMENT SERVER

| NO NEW MESSAGE RECEIVED. | CONFIRM NOTIFICATION |
|--------------------------|----------------------|

·MESSAGE FROM CLIENT

| NO NEW MESSAGE RECEIVED. | CONFIRM NOTIFICATION | CREATE NOTIFICATION |
|--------------------------|----------------------|---------------------|

FIG.9

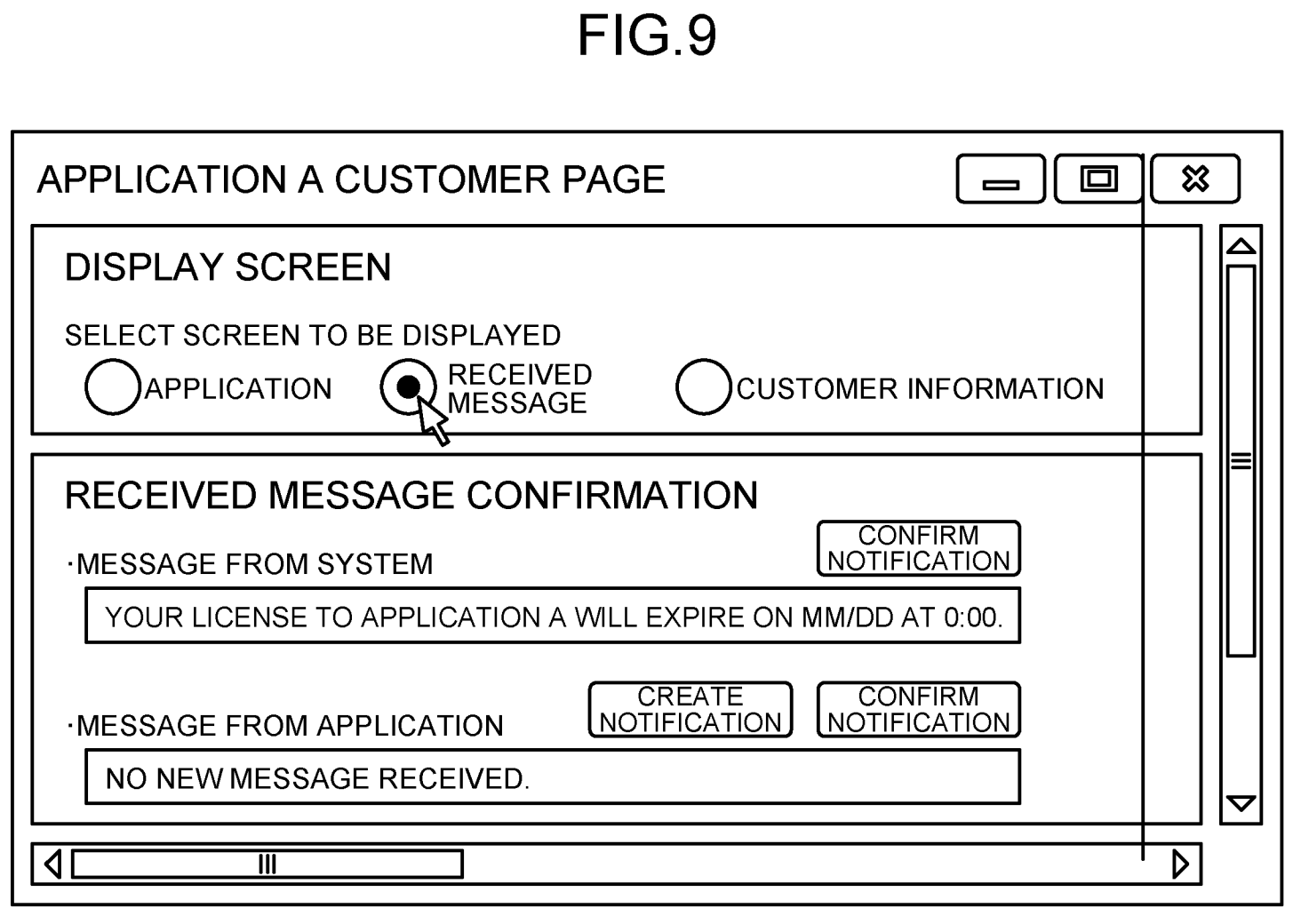

APPLICATION A CUSTOMER PAGE

DISPLAY SCREEN

SELECT SCREEN TO BE DISPLAYED

○ APPLICATION    ● RECEIVED MESSAGE    ○ CUSTOMER INFORMATION

RECEIVED MESSAGE CONFIRMATION

・MESSAGE FROM SYSTEM

YOUR LICENSE TO APPLICATION A WILL EXPIRE ON MM/DD AT 0:00.

CREATE NOTIFICATION    CONFIRM NOTIFICATION

・MESSAGE FROM APPLICATION

NO NEW MESSAGE RECEIVED.

CONFIRM NOTIFICATION

INFORMATION PROVIDING DEVICE, INFORMATION PROVIDING METHOD, INFORMATION MANAGEMENT DEVICE, AND COMPUTER-READABLE RECORDING MEDIUM

CROSS-REFERENCE TO RELATED APPLICATION

The present application claims priority to and incorporates by reference the entire contents of Japanese Patent Application No. 2022-140211 filed in Japan on Sep. 2, 2022.

FIELD

The present invention relates to an information providing device, an information providing method, an information management device, and a computer-readable recording medium.

BACKGROUND

Conventionally, a web application (simply referred to as an "application" as appropriate) for displaying measured values, set values, and the like transmitted from hardware and the like has been known. For example, a management company purchases an application from a development company, and provides the services offered by the application, to each user who installs a sensor or the like on an object to be managed such as a system and a plant managed by the management company.

The related technologies are described, for example, in: Japanese Patent Application Laid-open No. 2022-050323.

However, in the conventional technology, there is room for improvement in providing applications to users. For example, regardless of the number of users or the like, complicated and multifunctional applications need to be operated uniformly. Hence, the operation load of the management company is high, and the user's application cost will be increased.

The present invention has been made in view of the above, and an object of the present invention is to effectively manage applications per user.

SUMMARY

According to an aspect of the embodiments, an information providing device includes, an acquisition unit that acquires a request to use an application from a first user, a setting unit that sets a management area for running the requested application, for the first user, and a providing unit that provides the requested application to the management area set for the first user.

According to an aspect of the embodiments, an information providing method includes, acquiring a request to use an application from a first user, setting a management area for running the requested application, for the first user, and providing the requested application to the management area set for the first user.

According to an aspect of the embodiments, a computer-readable recording medium having stored therein an information providing program that causes a computer to execute a process includes, acquiring a request to use an application from a first user, setting a management area for running the requested application, for the first user; and providing the requested application to the management area set for the first user.

According to an aspect of the embodiments, an information management device includes, a reception unit that, from an information providing device that provides an application, receives a setting of a management area for running the application, an execution unit that executes a plurality of applications provided by the information providing device, in the management area, and a granting unit that grants each user who executes each application authority to use each of the applications.

According to an aspect of the embodiments, a computer-readable recording medium having stored therein an information management program that causes a computer to execute a process includes, from an information providing device that provides an application, receiving a setting of a management area for running the application, running a plurality of the applications provided by the information providing device, in the management area, and granting each user who runs each application authority to use each of the applications.

With the present invention, it is possible to effectively manage applications per user.

BRIEF DESCRIPTION OF THE DRAWINGS

FIG. 1 is a diagram illustrating a configuration example of an information processing system according to a first embodiment;

FIG. 3 is a diagram illustrating an example of a management information storage unit of an overall management server according to the first embodiment;

FIG. 4 is a diagram illustrating an example of an application information storage unit of an application server according to the first embodiment;

FIG. 7 is a diagram illustrating a specific example of a display screen of an application provider according to the second embodiment;

FIG. 8 is a diagram illustrating a specific example of a display screen of an application manager according to the second embodiment;

FIG. 9 is a diagram illustrating a specific example of a display screen of an application user according to the second embodiment;

DESCRIPTION OF EMBODIMENTS

Figure 2:
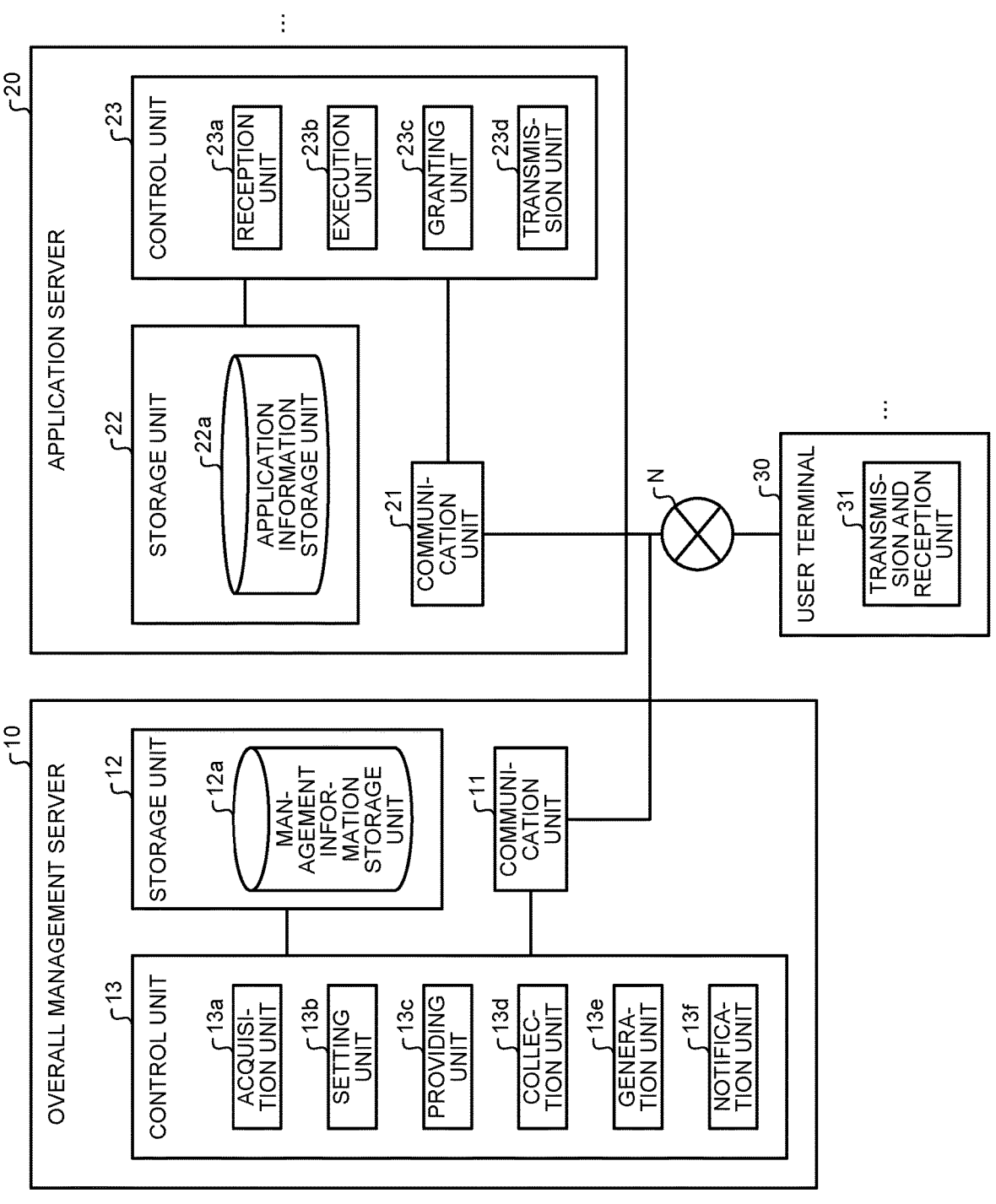
FIG. 2 is a block diagram illustrating a configuration example of each device according to the first embodiment.

Hereinafter, an information providing device, an information providing method, an information providing program, an information management device, and an information management program according to an embodiment of the present invention will be described in detail with reference to the accompanying drawings. It is to be noted that the present invention is not limited to the embodiments described below.

First Embodiment

In a first embodiment, a management process of applications installed in a distributed manner will be described. In the following, the configuration of an information processing system 100-1 according to the first embodiment, the configuration of each device, and the processing flow will be described in order, and finally, effects of the first embodiment will be described.

1. Configuration of Information Processing System 100-1

With reference to FIG. 1, a configuration of the information processing system 100-1 according to the first embodiment will be described in detail. FIG. 1 is a diagram illustrating a configuration example of the information processing system 100-1 according to an embodiment. Hereinafter, an overall configuration example of the information processing system 100-1, a process performed by the information processing system 100-1, and problems of the information processing system 100-1 of the reference technology will be described in order, and finally, effects of the information processing system 100-1 will be described. In the first embodiment, the production in the factory using plant equipment that is a device installed in a plant, is remotely monitored. However, the first embodiment does not limit the device and the field of application, and is applicable to monitoring environmental measurements from remote places such as monitoring electric power, wind power generation, water and sewage, and river.

1-1. Overall Configuration Example of Information Processing System 100-1

The information processing system 100-1 includes an overall management server 10 that is an information providing device, an application server 20 (20A, 20B, 20C, . . . ) that is an information management device, and a user terminal 30 (30A, 30B, 30C, . . . ). In this example, the overall management server 10 and application server 20 are built in a cloud environment. Moreover, the application servers 20A, 20B, 20C, . . . are each installed in a management area A, a management area B, a management area C, . . . , created by an application provider (simply referred to as a "provider" as appropriate) P who manages the entire information processing system 100-1.

The information processing system 100-1 illustrated in FIG. 1 may also include a plurality of the overall management servers 10. Moreover, the overall management server 10 may be integrated with the application server 20. The overall management server 10 and the application server 20 are not limited to server devices built in a cloud environment, and may also be physical servers, virtual machines, containers, and the like built in an on-premise environment.

1-2. Whole Process of Information Processing System 100-1: Diving and Providing Process of Application In the following, a dividing and providing process of an application in the information processing system 100-1 as above will be described.

1-2-1. Application Setting Process

The overall management server 10 installs an application in each management area in the cloud environment (see FIG. 1(1)). For example, the overall management server 10 installs an application requested by a manager M, in each management area set by an application manager (simply referred to as a "manager" as appropriate) M such as an agency that has contracted with the provider P and the like.

1-2-2. Application Area Setting Process

The overall management server 10 can further divide the management area in the cloud environment into a plurality of application areas that make up the application requested by the manager M, and can install the application divided into application areas (see FIG. 1(2)). For example, the overall management server 10 sets application areas corresponding to the contract status (for example, subscription agreement and the like) of an application user (simply referred to as a "user" as appropriate) U to be accommodated. In this process, the application server 20 can grant use authority to each contract status of the user U to be accommodated. For example, the application server 20A grants users UA-a1, . . . accommodated in an application area A-a, the authority to use three screens that is the number of available screens, the authority to allow five people that is the number of allowed users, and the authority to access 50 pieces of data that is the number of accessible data. The application server 20A also grants users UA-b1, . . . accommodated in the application area A-b, at least one of the authority to use six screens that is the number of available screens, the authority to allow ten people that is the number of allowed users, and the authority to access 100 pieces of data that is the number of accessible data.

1-2-3. Data Transmission and Reception Process

The application server 20 transmits and receives data to and from the user terminals 30 used by the users U in an application area unit (see FIG. 1(3)). For example, the application server 20A transmits and receives data to and from user terminals 30A-a1, . . . used by the users UA-a1, . . . accommodated in the application area A-a, and transmits and receives data to and from user terminals 30A-b1, . . . used by the user UA-b1, . . . accommodated in the application area A-b.

1-3. Information Processing of Reference Technology

In the following, an outline of information processing serving as a reference technology will be first described, followed by a description of the problems in the reference technology.

1-3-1. Outline of Information Processing of Reference Technology

In the information processing of the reference technology, the application manager creates an application, and provides services to many application users through a single application. In this case, one application corresponds to one platform.

Moreover, in the information processing of the reference technology, the application manager obtains an application from the application provider for the application user who has made an order, and executes engineering work for the application user. In this process, when multiple orders are received from the application user, the application manager executes the order every time, and executes engineering.

1-3-2. Problems in Information Processing of Reference Technology

There are following problems in the information processing of the reference technology. First, in the information processing of the reference technology, even if there are a small number of application users, the application manager needs to create a complicated and multifunctional application to satisfy various needs. Second, in the information processing of the reference technology, a long-term continuation of the system is difficult for the application manager unless there are a large number of application users. Third, in the information processing of the reference technology, all application users use a single application. Hence, if a specific application user causes unstable system operation by applying a large load during the application usage and the like, all the application users are affected at the same time. Fourth, in the information processing of the reference technology, to expand functions of a specific application user, the expansion is applied to all the application users. Hence, the other application users need to bear the expenses for the unnecessary functions. Fifth, in the information processing of the reference technology, even if the application manager wishes to provide the application directly to the application user, the management area and the license information for managing the management area need to be delivered to the application user from the application provider. In this manner, with the information processing of the reference technology, it is difficult to effectively manage applications per user.

1-4. Improvements in Information Processing System 100-1

In the following, an outline of the information processing system 100-1 according to the first embodiment will be first described, followed by a description of improvements in the information processing system 100-1.

1-4-1. Outline of Information Processing System 100-1

In the information processing system 100-1, the overall management server 10 acquires a request to use an application from the manager M, sets the management area where the application is to be built for the manager M, and provides the requested application to the application server 20 built in the management area of the manager M.

Moreover, in the information processing system 100-1, the application server 20 receives license information relating to the management of an application from the overall management server 10, and on the basis of the license information, the application server 20 runs a plurality of applications installed in each of the application areas of the management area divided by the overall management server 10. The application server 20 then sets the authority to use each of the applications to the user U.

That is, the information processing system 100-1 is a system that installs the applications, provides individual services, and monitors the applications. Moreover, the information processing system 100-1 is a system that can entrust the manager M such as an agency to manage the application, even if the manager M does not have a specialized knowledge on cloud environment and the like.

1-4-2. Improvements in Information Processing System 100-1

In the information processing system 100-1, the following improvements can be expected. First, in the information processing system 100-1, it is possible to narrow down the functions of the application, and install the applications in a small scale. Second, in the information processing system 100-1, even if the number of users U is small, there is no need to maintain a large platform. Hence, it is advantageous in cost, possible to install multiple applications, and possible to accommodate many users U. Third, in the information processing system 100-1, even if the application is stopped due to a software failure or overload, because the applications are distributed, all the applications do not stop at the same time. Fourth, in the information processing system 100-1, it is possible to expand a specific function in a small scale unit or in a user U unit. Fifth, in the information processing system 100-1, it is possible to sell the pieces of the management area to the manager M such as an agency. Hence, it is possible to easily expand the business of the entire system. In this manner, in the information processing system 100-1, it is possible to effectively manage applications per user.

2. Configuration of Each Device in Information Processing System 100-1

With reference to FIG. 2, a functional configuration of each device in the information processing system 100-1 illustrated in FIG. 1 will be described. FIG. 2 is a block diagram illustrating a configuration example of each device according to the first embodiment. In the following, an overall configuration example of the information processing system 100-1 according to the first embodiment will be first described, followed by a detailed description of configuration examples of the overall management server 10, the application server 20, and the user terminal 30 according to the first embodiment.

2-1. Overall Configuration Example of Information Processing System 100-1

As illustrated in FIG. 2, the information processing system 100-1 includes the overall management server 10, the application servers 20, and the user terminals 30. The overall management server 10 and each of the application servers 20 are communicatively connected by a predetermined communication network in the cloud environment. Moreover, the user terminal 30 is communicably connected by a communication network N such as the Internet link.

The overall management server 10 and the application server 20 are not limited to server devices built in a cloud environment, and may also be physical servers, virtual machines, containers, and the like built in an on-premise environment.

2-2. Configuration Example of Overall Management Server 10

First, a configuration example of the overall management server 10 that is an information providing device will be described with reference to FIG. 2. The overall management server 10 includes a communication unit 11, a storage unit 12, and a control unit 13. The overall management server 10 may also include an input unit (for example, a keyboard, a mouse, and the like) that receives various operations from the system provider of the information processing system 100-1, and a display unit (for example, a liquid crystal display and the like) for displaying various types of information.

2-2-1. Communication Unit 11

The communication unit 11 performs data communication with other devices. For example, the communication unit 11 performs data communication with each communication device via a router and the like. Moreover, the communication unit 11 can perform data communication with a terminal of the operator, which is not illustrated.

2-2-2. Storage Unit 12

The storage unit 12 stores various types information to be referred to when the control unit 13 is operated, and various types of information obtained when the control unit 13 is operated. The storage unit 12 includes a management information storage unit 12a. In this example, the storage unit 12 can be implemented by a semiconductor memory element such as a Random Access Memory (RAM) and a flash memory, a storage device such as a hard disk and an optical disc, or the like, for example. In the example in FIG. 2, the storage unit 12 is installed inside the overall management server 10. However, the storage unit 12 may also be installed outside the overall management server 10, or a plurality of storage units may be installed.

2-2-2-1. Management Information Storage Unit 12a

The management information storage unit 12a stores management information such as manager license information to be notified by a notification unit 13f of the control unit 13, which will be described below. In this example, with reference to FIG. 3, an example of information to be stored in the management information storage unit 12a will be described. FIG. 3 is a diagram illustrating an example of the management information storage unit 12a of the overall management server 10 according to the first embodiment. In the example in FIG. 3, the management information storage unit 12a has items such as "Management Area Identification Information", "Application Identification Information", "Manager License Information", and "Manager Identification Information".

The "Management Area Identification Information" indicates identification information for identifying the management area, and is the identification number or identification symbol of the management area, for example. The "Application Identification Information" indicates identification information for identifying the application, and is the identification number or identification symbol of the application server 20, for example. The "Manager License Information" indicates license information that enables the manager M to manage the application granted to the manager M, and is certain command information, for example. The "Manager Identification Information" indicates identification information for identifying the manager M, and is the identification number or identification symbol of an agency, for example.

That is, FIG. 3 illustrates an example of the management area identified by the management area identification information "Management Area A", in which the application identified by the application identification information "Application A" is installed, the manager license information granted to the manager M is "ML-A001", and the manager M is identified by the manager identification information "MID-A". Moreover, similarly, FIG. 3 illustrates an example of the management area identified by the management area identification information "Management Area B", in which the application identified by the application identification information "Application B" is installed, the manager license information granted to the manager M is "ML-B001", and the manager M is identified by the manager identification information "MID-B". FIG. 3 also illustrates an example of the management area identified by the management area identification information "Management Area C", in which the application identified by the application identification information "Application C" is installed, the manager license information granted to the manager M is "ML-0001", and the manager M is identified by the manager identification information "MID-C".

2-2-3. Control Unit 13

The control unit 13 controls the entire overall management server 10. The control unit 13 includes an acquisition unit 13a, a setting unit 13b, a providing unit 13c, a collection unit 13d, a generation unit 13e, and a notification unit 13f. In this example, the control unit 13 may be implemented by an electronic circuit such as a Central Processing Unit (CPU) or a Micro Processing Unit (MPU), and an integrated circuit such as an Application Specific Integrated Circuit (ASIC) or a Field Programmable Gate Array (FPGA), for example.

2-2-3-1. Acquisition Unit 13a

The acquisition unit 13a acquires a request to use an application from the manager M who is a first user. As a specific example, the acquisition unit 13a acquires a request to use an application A from an agency A that is the manager M, acquires a request to use an application B from an agency B that is the manager M, and acquires a request to use an application C from an agency C that is the manager M. Moreover, the acquisition unit 13a may also acquire information relating to required resources from the manager M. For example, the acquisition unit 13a may also acquire information relating to resources such as the number of users to be accommodated and the number of data from the manager M.

2-2-3-2. Setting Unit 13b

The setting unit 13b sets a management area for running the requested application, for the manager M who is the first user. For example, the setting unit 13b generates a management area allocated with the divided resources of the cloud system that provides a cloud environment. Moreover, the setting unit 13b divides the management area generated for the manager M who is the first user, and generates a plurality of areas (application areas) within the management area.

As a specific example, the setting unit 13b sets the management area A for running the application A in the cloud environment according to the resources requested by the agency A that is the manager M, sets the management area B for running the application B in the cloud environment according to the resources requested by the agency B that is the manager M, and sets the management area C for running the application C in the cloud environment according to the resources requested by the agency C that is the manager M. Moreover, the setting unit 13b divides the management area A according to the request from the agency A that is the manager M, and generates the application area A-a and the application area A-b in the management area A.

2-2-3-3. Providing Unit 13c

The providing unit 13c provides the requested application in the management area set for the manager M who is the first user. In this process, the providing unit 13c may also install the requested application on the application server 20 built in the management area of the manager M, or may transmit the requested application information to the application server 20, and cause the application server 20 to install the requested application.

Moreover, in the cloud environment, the providing unit 13c installs an application on a virtual machine generated as the application server 20 using the resources allocated to the management area. On the other hand, the providing unit 13c may install each of the applications that make up the application requested by the manager M who is the first user, on each of the application servers 20 that is the physical server built in each of the areas. In this process, the providing unit 13c may also install a different application in each of the areas. As a specific example, the providing unit 13c may install the application A in an application area a within the management area A, and may install the application B in an application area b.

2-2-3-4. Collection Unit 13d

The collection unit 13d collects various types of information from the application server 20. The details of the process performed by the collection unit 13d will be described below in the second embodiment.

2-2-3-5. Generation Unit 13e

The generation unit 13e generates contact information to be notified to the application server 20 and the user terminal 30. The details of the process performed by the generation unit 13e will be described below in the second embodiment.

2-2-3-6. Notification Unit 13f

The notification unit 13f notifies the application server 20 and the user terminal 30 of the contact information. The details of the process performed by the notification unit 13f will be described below in the second embodiment.

2-3. Configuration Example of Application Server 20

With reference to FIG. 2, a configuration example of the application server 20 that is the information management device will be described. The application server 20 includes a communication unit 21, a storage unit 22, and a control unit 23. The application server 20 may also include an input unit (for example, a keyboard, a mouse, and the like) that receives various operations from the system provider of the information processing system 100-1, and a display unit (for example, a liquid crystal display and the like) for displaying various types of information.

2-3-1. Communication Unit 21

The communication unit 21 performs data communication with other devices. For example, the communication unit 21 performs data communication with each communication device via a router and the like. Moreover, the communication unit 21 can perform data communication with a terminal of the operator, which is not illustrated.

2-3-2. Storage Unit 22

The storage unit 22 stores various types information to be referred to when the control unit 23 is operated, and various types of information obtained when the control unit 23 is operated. The storage unit 22 includes an application information storage unit 22*a*. In this example, the storage unit 22 can be implemented by a semiconductor memory element such as a RAM and a flash memory, a storage device such as a hard disk and an optical disc, or the like, for example. In the example in FIG. 2, the storage unit 22 is installed inside the application server 20. However, the storage unit 22 may also be installed outside the application server 20, or a plurality of storage units may be installed.

2-3-2-1. Application Information Storage Unit 22*a*

The application information storage unit 22*a* stores application information such as the use authority of the user U granted by a granting unit 23*c* of the control unit 23, which will be described below. In this example, with reference to FIG. 4, an example of information to be stored in the application information storage unit 22*a* will be described. FIG. 4 is a diagram illustrating an example of the application information storage unit 22*a* of the application server 20 according to the embodiment. In the example in FIG. 4, the application information storage unit 22*a* has items such as "Application Identification Information", "Application Area Identification Information", "Use Authority", "User Identification Information", "User License Information", and "User Location Information".

The "Application Identification Information" indicates identification information for identifying the application, and is the identification number or identification symbol of the application server 20, for example. The "Application Area Identification Information" indicates identification information for identifying the application area, and is the identification number or identification symbol of the application area, the hierarchical structure of the application area, or the like, for example. The "Use Authority" indicates the usable range of the application granted to the user U, and is the number of available screens, the number of allowed users, the number of accessible data, or the like, for example. The "User Identification Information" indicates identification information for identifying the user U, and is the identification number or identification symbol of the user U, for example. The "User License Information" indicates license information that allows the user U to use the application granted to the user U, and is a certain password, for example. The "User Location Information" indicates the location information on the screen on which the application is used, that is accessed by the user U upon using the application, and is a Uniform Resource Locator (URL) of a "customer's page" of the user U, for example.

That is, in an example of the application identified by the application identification information "Application A" illustrated in FIG. 4, the use authority of the application area identified by the application area identification information "Application Area a" includes "three screens" that is the number of available screens, "five people" that is the number of allowed users, and "50 pieces of data" that is the number of accessible data. Also, the users U of (user identification information "UID-a001", user license information "UL-a001", user location information "URL-a001", . . . ), (user identification information "UID-a002", user license information "UL-a002", user location information "URL-a002", . . . ), . . . are accommodated therein. Moreover, similarly, in an example of the application identified by the application identification information "Application A", the use authority of the application area identified by the application area identification information "Application Area b" includes "six screens" that is the number of available screens, "ten people" that is the number of allowed users, and "100 pieces of data" that is the number of accessible data. Also, the users U of (user identification information "UID-b001", user license information "UL-b001", user location information "URL-b001", . . . ), (user identification information "UID-b002", user license information "UL-b002", user location information "URL-b002", . . . ), . . . are accommodated therein.

2-3-3. Control Unit 23

The control unit 23 controls the entire application server 20. The control unit 23 includes a reception unit 23*a*, an execution unit 23*b*, a granting unit 23*c*, and a transmission unit 23*d*. In this example, the control unit 23 can be implemented by an electronic circuit such as a CPU or a MPU, or an integrated circuit such as an ASIC or an FPGA, for example.

2-3-3-1. Reception Unit 23*a*

The reception unit 23*a* receives the setting of the management area for running the application, from the overall management server 10 that is the information providing device for providing applications. As a specific example, the reception unit 23*a* runs the application A transmitted from the overall management server 10 in the application area a, and receives the manager license information "UL-a001" that allows the manager to manage the application.

Moreover, the reception unit 23*a* receives various types of information from the device. For example, the reception unit 23*a* receives a sensor value transmitted from plant equipment such as a sensor device installed in the plant. Furthermore, the reception unit 23*a* receives various types of information from the user terminal 30. For example, the reception unit 23*a* receives a request relating to a change in the calculation method of the plant information obtained at the plant, from the user terminal 30.

2-3-3-2. Execution Unit 23*b*

The execution unit 23*b* runs the applications provided by the overall management server 10 in the management area. As a specific example, the execution unit 23*b* runs the application A installed in the application area a and the application A installed in the application area b, that are transmitted from the overall management server 10.

2-3-3-3. Granting Unit 23*c*

The granting unit 23*c* grants each user who runs each application the authority to use each of the applications. For example, the granting unit 23*c* grants each user the authority to use each of the applications, in which at least one of the number of available screens, the number of allowed users, and the number of accessible data provided by the application is set according to the number of users of each application. As a specific example, the granting unit 23c grants the user U-a accommodated in the application area a, the authority to use the minimum unit (the number of available screens is "three screens", the number of allowed users is "five people", and the number of accessible data is "50 pieces of data"). The granting unit 23c also grants the user U-b accommodated in the application area b the authority to use twice the resources of the minimum unit (the number of available screens is "six screens", the number of allowed users is "ten people", and the number of accessible data is "100 pieces of data").

2-3-3-4. Transmission Unit 23d

The transmission unit 23d transmits change information indicating that the authority to use each of the applications set thereto, the user information relating to the user U who uses each of the applications, and the user U who uses each of the applications are changed, to the overall management server 10. Moreover, the transmission unit 23d transmits data output by running the application requested by each of the users U, to the users U accommodated in each of the applications. As a specific example, when the users UA-a1, UA-a2, . . . are accommodated in the application A installed in the application area a, the transmission unit 23d transmits the operation data calculated by operation methods A1, A2, . . . of each plant information used for running the application A, requested by each of the users UA-a1, UA-a2, . . . .

2-4. Configuration Example of User Terminal 30

With reference to FIG. 2, a configuration example of the user terminal 30 will be described. For example, the user terminal 30 can be implemented by a notebook Personal Computer (PC), a desktop PC, a smart phone, a tablet terminal, a cell phone, a Personal Digital Assistant (PDA), and the like. The user terminal 30 includes a transmission and reception unit 31.

2-4-1. Transmission and Reception Unit 31

The transmission and reception unit 31 transmits various types of information. For example, the transmission and reception unit 31 transmits a request to change the use authority to the application server 20. Moreover, the transmission and reception unit 31 receives various types of information. For example, the transmission and reception unit 31 receives plant information (measured values, set values, calculated values, and the like of plant equipment) of the plant transmitted by the application server 20.

3. Flow of Processing Performed by Information Processing System 100-1

Figure 5:
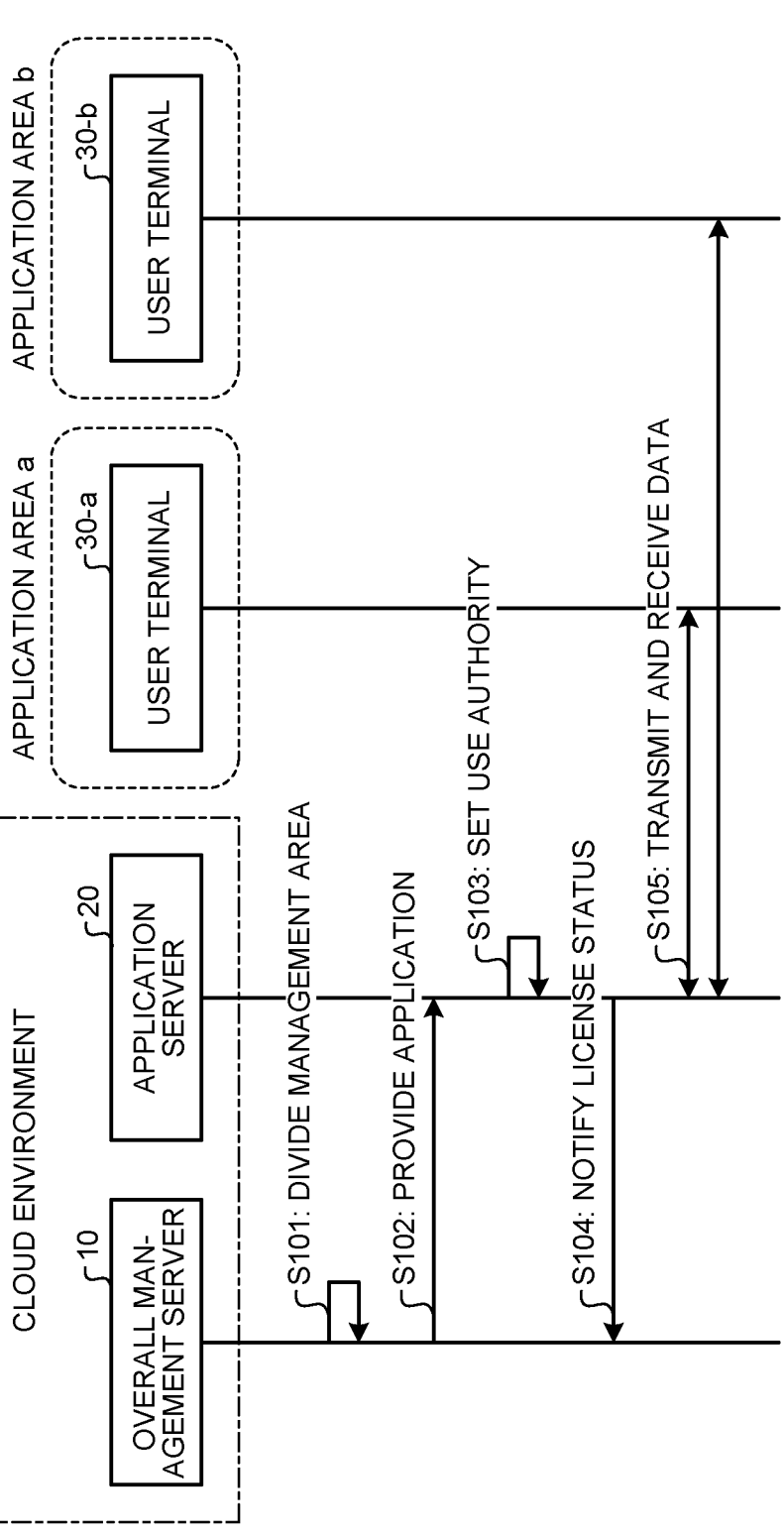
FIG. 5 is a sequence diagram illustrating an example of a flow of information processing according to the first embodiment.

With reference to FIG. 5, a flow of processing performed by the information processing system 100-1 according to the first embodiment will be described. FIG. 5 is a sequence diagram illustrating an example of a flow of information processing according to the first embodiment. It is to be noted that the processes at the following steps S101 to S108 may be performed in a different order. Moreover, among the processes at the following steps S101 to S108, some may be omitted.

3-1. Management Area Dividing Process

The overall management server 10 divides the management area (step S101). For example, the overall management server 10 divides the management area into a management area A, a management area B, a management area C, . . . on the cloud platform corresponding to agencies A, B, C, . . . that are each the manager M. Moreover, the overall management server 10 can further divide the management area allocated to the manager M. For example, the overall management server 10 may further divide the management area A on the cloud platform corresponding to the agency A that is the manager M, and generate the application area A-a and the application area A-b.

3-2. Application Providing Process

The overall management server 10 provides applications (step S102). For example, the overall management server 10 installs the application A, the application B, the application C, . . . on the application server 20 built in each of the management area A, the management area B, the management area C, . . . on the cloud platform. In this process, the overall management server 10 may also transmit installation information of the application to the application server 20, and cause the application server 20 to install the application.

3-3. Use Authority Setting Process

The application server 20 sets use authority for each application area (step S103). For example, the application server 20 sets the authority to use each of the application area a and the application area b, including the number of available screens, the number of allowed users, the number of accessible data, and the like, in response to an order (license purchase and the like) from the user U.

3-4. License Status Notification Process

The application server 20 notifies the overall management server 10 of the license status (step S104). For example, the application server 20 periodically notifies the overall management server 10 of the license status (license allocation status of the user U) managed by the application server 20. Therefore, the overall management server 10 can view all the license information of the user U to which the application is provided.

3-5. Data Transmission and Reception Process

The application server 20 and the user terminal 30 (30-a, 30-b) transmit and receive data (step S105). For example, the application server 20 transmits and receives operation data A-a to and from a user terminal 30-a, and transmits and receives operation data A-b to and from a user terminal 30-b.

4. Effects of First Embodiment

Finally, effects of the first embodiment will be described. In the following, first to fourth effects corresponding to the process according to the embodiment will be described.

4-1. First Effect

First, in the process according to the first embodiment described above, a request to use an application is acquired from the manager M, a management area for running the requested application is set for the manager M, and the requested application is provided in the management area set for the manager M. Therefore, in the present process, it is possible to effectively manage applications per user.

4-2. Second Effect

Second, in the process according to the first embodiment described above, the management area generated for the manager M is divided, a plurality of application areas are generated within the management area, and each of the applications that make up the requested application is installed in each of the application areas. Therefore, in the present process, it is possible to effectively manage applications per user, by further dividing the management area on the cloud platform.

4-3. Third Effect

Third, in the process according to the first embodiment described above, the management area allocated with the divided resources of the cloud system that provides a cloud environment is generated, and the application is installed on a virtual machine generated as the application server 20 using the resources allocated to the management area. Therefore, in the present process, it is possible to effectively manage applications per user on the cloud platform.

4-4. Fourth Effect

Fourth, in the process according to the first embodiment described above, the application areas are generated within the management area by dividing the management area, and each of the applications requested by the manager M is installed on each of the application servers 20 built in each of the application areas. Therefore, in the present process, it is possible to effectively manage applications per user, by further dividing the management area within the physical server.

Second Embodiment

In a second embodiment, a notification process of various types of information, in the management process of applications in the first embodiment will be described. In the following, the configuration of the information processing system 100-2 according to the second embodiment, the configuration of each device, and the processing flow will be described in order, and finally, effects of the second embodiment will be described. The description of the same configurations and processes as those in the first embodiment will be omitted.

1. Configuration of Information Processing System 100-2

Figure 6:
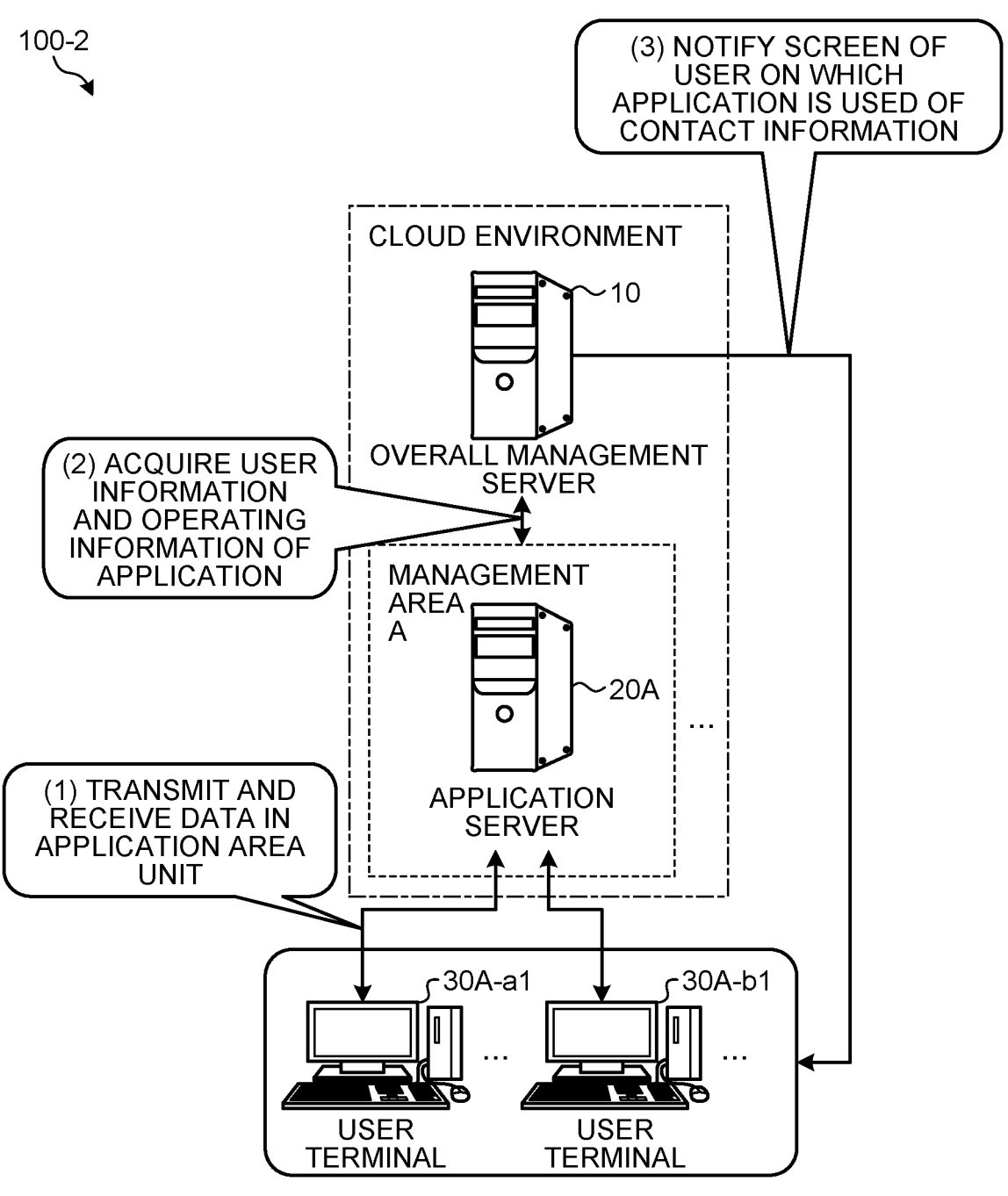
FIG. 6 is a diagram illustrating a configuration example of an information processing system according to a second embodiment.

With reference to FIG. 6, a configuration of the information processing system 100-2 according to the second embodiment will be described in detail. FIG. 6 is a diagram illustrating a configuration example of the information processing system 100-2 according to the second embodiment. Hereinafter, an overall configuration example of the information processing system 100-2, a process performed by the information processing system 100-2, and problems of the equipment management system of the reference technology will be described in order, and finally, effects of the information processing system 100-2 will be described.

1-1. Overall Configuration Example of Information Processing System 100-2

The information processing system 100-2 includes the overall management server 10 that is an information providing device, the application server 20 (20A, . . . ) that is an information management device, and the user terminal 30 (30A, . . . ). In this example, the overall management server 10 and application server 20 are built in a cloud environment. Moreover, the application servers 20A, . . . are each installed in the management area A, . . . , created by the provider P who manages the entire information processing system 100-2.

The information processing system 100-2 illustrated in FIG. 6 may include a plurality of the overall management servers 10. Moreover, the overall management server 10 may be integrated with the application server 20. The overall management server 10 and the application server 20 are not limited to server devices built in a cloud environment, and may also be physical servers, virtual machines, containers, and the like built in an on-premise environment.

1-2. Whole Process of Information Processing System 100-2: Information Notification Process In the following, a notification process of various types of information in the information processing system 100-2 as above will be described.

1-2-1. Data Transmission and Reception Process

The application server 20 transmits and receives data to and from the user terminal 30 used by the user U in an application area unit (see FIG. 6(1)). For example, the application server 20A transmits and receives data to and from the user terminals 30A-a1, . . . used by the users UA-a1, . . . , and transmits and receive data to and from the user terminals 30A-b1, . . . used by the users UA-b1, . . . .

1-2-2. Information Acquisition Process

The overall management server 10 acquires user information and application operating information from the application server 20 (see FIG. 6(2)). For example, the overall management server 10 acquires user information such as the user name, URL, and password of the user U accommodated in the application server 20A, from the application server 20A. Moreover, the overall management server 10 acquires operating information of the application such as the number of data used per day of the user U accommodated in the application server 20A, from the application server 20A.

1-2-3. Contact Information Notification Process

The overall management server 10 notifies the user U by sending the contact information to the screen of the user U on which the application is used (see FIG. 6(3)). For example, if the expiration date of the license information of the accommodating application user U is approaching, the overall management server 10 notifies the user U of the contact information urging the user U to update the license information. Moreover, the overall management server 10 may also notify the manager M by sending the contact information to the screen of the manager M on which the application is managed, or notify the manager M and the user U by sending the contact information to the screen of the manager M on which the application is managed and to the screen of the user U on which the application is used. For example, if there is application update information to be provided, the overall management server 10 notifies the manager M of contact information urging the manager M to update the application. Moreover, to perform an emergency maintenance on the management area on the cloud environment, the overall management server 10 notifies the manager M and the user U of the contact information indicating the start time and end time of the maintenance corresponding to the failure.

1-3. Problems in Information Processing of Reference Technology

In the information processing of the reference technology, when the application provider wishes to notify the application manager and the application user, the notification to the application user will be indirect contact from the application manager to the application user. Hence there are problems that it is difficult to send information urgently, instantaneously, and widely. In this manner, with the information processing of the reference technology, it is difficult to effectively manage applications per user.

1-4. Improvements in Information Processing System 100-2

In the following, an outline of the information processing system 100-2 according to the second embodiment will be first described, followed by a description of improvements in the information processing system 100-2.

1-4-1. Outline of Information Processing System 100-2

In the information processing system 100-2, the manager information of the manager M and the user information of the user U who uses the application are collected, and on the basis of the contact information to be notified, the notification is made to one of the manager M, the user U, and the manager M and user U.

That is, the information processing system 100-2 is a system capable of directly transmitting contact information from the provider P such as "from the provider P to the user U" and "from the provider P to the manager M".

1-4-2. Improvements in Information Processing System 100-2

In the information processing system 100-2, by sharing information among the user U, the manager M, and the provider P, it is possible to send information urgently, instantaneously, and widely. Hence, it is possible to expect improvements in operating the web application smoothly. That is, in the information processing system 100-2, it is possible to effectively manage applications per user.

2. Configuration of Each Device in Information Processing System 100-2

In the following, a functional configuration of the overall management server 10 in the information processing system 100-2 illustrated in FIG. 6 will be described. The overall configuration example of the information processing system 100-2, the configuration examples of the application server 20 and the user terminal 30 are the same as those in the first embodiment illustrated in FIG. 2. Hence, the description thereof will be omitted.

2-1. Configuration Example of Overall Management Server 10

The overall management server 10 includes the communication unit 11, the storage unit 12, and the control unit 13. The overall management server 10 may also include an input unit (for example, a keyboard, a mouse, and the like) that receives various operations from the system provider of the information processing system 100-2, and a display unit (for example, a liquid crystal display and the like) for displaying various types of information.

2-1-1. Communication Unit 11

The communication unit 11 performs data communication with other devices. Because the communication unit 11 performs the same process as that in the first embodiment illustrated in FIG. 2, the description thereof will be omitted.

2-1-2. Storage Unit 12

The storage unit 12 stores various types information to be referred to when the control unit 13 is operated, and various types of information obtained when the control unit 13 is operated. Because the storage unit 12 performs the same process as that in the first embodiment illustrated in FIG. 2, the description thereof will be omitted.

2-1-3. Control Unit 13

The control unit 13 controls the entire overall management server 10. Similar to FIG. 2, the control unit 13 includes the acquisition unit 13*a*, the setting unit 13*b*, the providing unit 13*c*, the collection unit 13*d*, the generation unit 13*e*, and the notification unit 13*f*. In this example, the control unit 13 can be implemented by an electronic circuit such as a CPU or a MPU, or an integrated circuit such as an ASIC or an FPGA, for example.

2-1-3-1. Acquisition Unit 13*a*

The acquisition unit 13*a* acquires various types of information. The details of the process performed by the acquisition unit 13*a* are the same as those in the first embodiment described above. Hence, the description thereof will be omitted.

2-1-3-2. Setting Unit 13*b*

The setting unit 13*b* sets the management area. The details of the process performed by the setting unit 13*b* are the same as those in the first embodiment described above. Hence, the description thereof will be omitted.

2-1-3-3. Providing Unit 13*c*

The providing unit 13*c* provides applications. The details of the process performed by the providing unit 13*c* are the same as those in the first embodiment described above. Hence, the description thereof will be omitted.

2-1-3-4. Collection Unit 13*d*

The collection unit 13*d* collects first user information of the manager M who is the first user, and second user information of the user U who is the second user using the application. For example, the collection unit 13*d* collects location information on the screen of the manager M on which the application is managed, location information on the screen of the user U on which the application is used, and the like.

A specific example will be described. The collection unit 13*d* collects URL "URL-A" of the "Client Management Page" of the agency A that is the manager M of the application A, URL "URL-a001" of the "Customer Page" of the user UA-a1, URL "URL-b001" of the "Customer Page" of the user UA-b1, and the like, via the application server 20A.

2-1-3-5. Generation Unit 13*e*

The generation unit 13*e* generates contact information. For example, as the contact information, the generation unit 13*e* generates maintenance information relating to periodic or emergency maintenance, user license information relating to the expiration date of the license of the user U, or application update information relating to the update of the application.

2-1-3-6. Notification Unit 13*f*

On the basis of the type of notification (for example, maintenance information, expiration date of the license, and application update) to be made to the manager M or the user U using the application, the notification unit 13*f* notifies at least one of the manager M and the user U.

For example, when there is a failure in running the application, the notification unit 13*f* notifies the manager M and the user U of the maintenance information relating to the maintenance corresponding to the failure. A specific example will be described. When there is a failure in a cloud platform, the notification unit 13*f* notifies the manager M and the user U, by sending maintenance information such as "There will be emergency maintenance", to the screen of the manager M on which the application is managed and to the screen of the user U on which the application is used.

Moreover, the notification unit 13*f* notifies the user U of information urging the user U to update the license, before a predetermined period of the expiration date of the application license used by the user U. A specific example will be described. A month before the expiration date of the license of the user U, the notification unit 13*f* notifies the user U by sending user license information such as "Your license to the application A will expire on MM/DD at 0:00" to the screen of the user U on which the application is used.

Moreover, the notification unit 13*f* notifies the manager M of information relating to the update of the application managed by the manager M. A specific example will be described. When it is possible to update the application, the notification unit 13*f* notifies the manager M by sending update information of the application such as "A new version of the application A is now available" to the screen of the manager M on which the application is managed.

2-2. Specific Example of Display Screen

With reference to FIG. 7 to FIG. 9, specific examples of a display screen generated by the generation unit 13*e* of the overall management server 10 will be described. In the following, a display screen of the application provider P, a display screen of the application manager M, and a display screen of the application user U will be described in this order.

2-2-1. Display Screen of Application Provider P

With reference to FIG. 7, a specific example of the display screen of the application provider P will be described. FIG. 7 is a diagram illustrating a specific example of the display screen of the application provider P according to the second embodiment. In the following, the "Notification Destination", "Management Area", "List of Notification Destinations", and "Notification Message" on the "Application Providing System Management Screen" will be described in this order.

2-2-1-1. Notification Destination

As illustrated in FIG. 7, the overall management server 10 displays notification destinations of contact information in a selectable manner. In the example in FIG. 7, as the notification destinations, the overall management server 10 displays "Agency" that is the manager M and "User" that is the user U, such that the "Agency" and "User" can be selected by radio buttons. In this process, the provider P can select the notification destination of the "Agency", the "User", and the "Agency" and "User".

2-2-1-2. Management Area

As illustrated in FIG. 7, the overall management server 10 displays the management areas of the notification destination in a selectable manner. In the example in FIG. 7, the overall management server 10 displays a pull-down menu from which the identification number and the like of the management area such as the "Management Area A" can be selected.

2-2-1-3. List of Notification Destinations

As illustrated in FIG. 7, the overall management server 10 displays a list of managers M and users U of the application selected from the notification destinations and the management areas described above. In the example in FIG. 7, because the notification destination "User" and the management area "Management Area A" are selected, the overall management server 10 displays a list of users U (user ID, user license ID, user URL, and the like) who use the application A of the application server 20 set in the management area A. In this process, the provider P can select the user U to be notified, by checking a check box or the like.

2-2-1-4. Notification Message

As illustrated in FIG. 7, the overall management server 10 displays an input screen of contact information to be notified to the notification destination selected from the list of notification destinations described above. In the example in FIG. 7, the overall management server 10 displays a text box where the provider P can enter a notification message. In this process, the provider P can directly enter a message such as "Your license to the application A will expire on MM/DD at 0:00" in the text box.

2-2-1-5. Others

The overall management server 10 can also determine the notification destination according to the content of the notification message. For example, when there is a failure in a cloud environment, the overall management server 10 may also determine the notification destination of the contact information indicating that the emergency maintenance will be performed, to the manager M and the user U. Moreover, the overall management server 10 may automatically generate contact information using the user information of the user U. For example, the overall management server 10 may generate a notification message urging the user U to update the user license for each user U, a month before the expiration date of the user license of the application of the user U.

2-2-2. Display Screen of Application Manager M

With reference to FIG. 8, a specific example of the display screen of the application manager M will be described. FIG. 8 is a diagram illustrating a specific example of a display screen of the application manager M according to the second embodiment. In the following, the "User Management Information" and "Notification Management Information" in the "Client Management Page Agent A (Management Area A)" will be described in this order.

2-2-2-1. User Management Information

As illustrated in FIG. 8, the overall management server 10 displays user information of the user U accommodated in the application managed by the manager M. In the example in FIG. 8, the overall management server 10 displays the user information (user ID, user license ID, user URL, and the like) of the user U accommodated in the application A of the agency A that is the manager M, for each of the "Application Area a" and "Application Area b".

2-2-2-2. Notification Management Information

As illustrated in FIG. 8, the overall management server 10 displays the notification message notified to the manager M. In the example in FIG. 8, the overall management server 10 displays "Message from overall management server" that is a notification message from the provider P, and "Message from client" that is a notification message from the user U. If there is no notification message, the overall management server 10 displays a message such as "No new message received". In this process, by clicking the button of the "Confirm Notification", the manager M can inquire the overall management server 10 whether there is a received message. Moreover, by clicking the button of the "Create Notification", the manager M can create a notification message by displaying a screen for creating a notification message to the user U.

2-2-2-3. Others

By clicking the user information of the user U in the "User Management Information", the manager M can display a screen for setting the user information of the user U, and change the setting of the user information and the use authority of the application.

2-2-3. Display Screen of Application User U

With reference to FIG. 9, a specific example of a display screen of the application user U will be described. FIG. 9 is a diagram illustrating a specific example of a display screen of the application user U according to the second embodiment. In the following, the "Display Screen" and "Received Message Confirmation" in the "Application A Customer Page" will be described in this order.

2-2-3-1. Display Screen

As illustrated in FIG. 9, the overall management server 10 displays the display screen relating to the application in a selectable manner. In the example in FIG. 9, as the display screen, the overall management server 10 displays "Application" for displaying the running status of the application, "Received Message" for displaying the notification message received from the provider P and the manager M, and "Customer Information" for displaying the user information of the user U, such that the "Application", "Received Message", and "Customer Information" can be selected by radio buttons. In this process, the provider P may also select a plurality of display screens.

2-2-3-2. Received Message Confirmation

As illustrated in FIG. 9, the overall management server 10 displays the notification messages received from the provider P and the manager M. In the example in FIG. 9, based on the selection of the display screen "Received Message", the overall management server 10 displays each of the "Message from system" that is a notification message from the provider P, and "Message from application" that is a notification message from the manager M. If there is no notification message, the overall management server 10 displays a message such as "No new message received". In the example in FIG. 9, the overall management server 10 receives the message of "Your license to the application A will expire on MM/DD at 0:00" created on the display screen of the application provider P in FIG. 7, as the notification message from the provider P. In this process, by clicking the button of the "Confirm Notification", the user U can inquire the overall management server 10 or the application server 20 whether there is a received message. Moreover, by clicking the button of the "Create Notification", the user U can create a notification message, by displaying a screen for creating a notification message to the manager M.

2-2-3-3. Others

By selecting the "Customer Information" as the display screen, the manager M can also display the screen for setting the user information of the user U, and change the setting of the user information. Moreover, by sending a notification message to the manager M, the manager M can request to change the authority to use the application or report a failure in the application.

3. Flow of Processing Performed by Information Processing System 100-2

Figure 10:
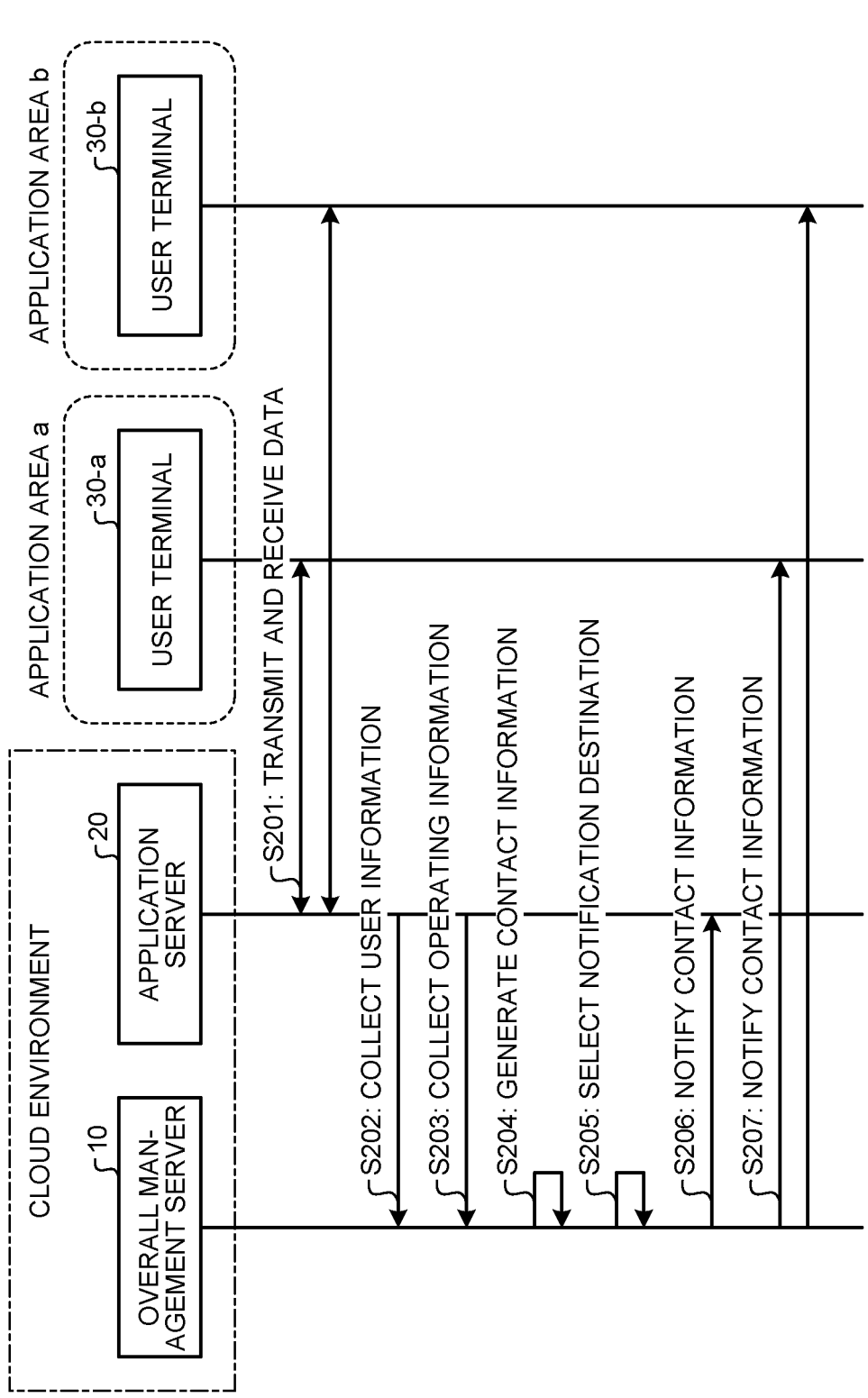
FIG. 10 is a sequence diagram illustrating an example of a flow of information processing according to the second embodiment.

With reference to FIG. 10, a flow of processing performed by the information processing system 100-2 according to the second embodiment will be described. FIG. 10 is a sequence diagram illustrating an example of a flow of information processing according to the second embodiment. It is to be noted that the processes at the following steps S201 to S207 may be executed in a different order. Moreover, among the processes at the following steps S201 to S207, some may be omitted.

3-1. Data Transmission and Reception Process

The application server 20 and the user terminal 30 (30-*a*, 30-*b*) transmit and receive data (step S201). For example, the application server 20 transmits and receives operation data A-a to and from the user terminal 30-*a*, and transmits and receives operation data A-b to and from the user terminal 30-*b*.

3-2. Information Collection Process

The overall management server 10 collects user information from the application server 20 (step S202). For example, the overall management server 10 collects the location information on the screen of the user U on which the application is used, as the user information of the user U from the application server 20. Moreover, the overall management server 10 collects operating information from the application server 20 (step S203). For example, the overall management server 10 collects the number of data of the application used by the user U per day, from the application server 20.

3-3. Contact Information Generation Process

The overall management server 10 generates contact information (step S204). For example, the overall management server 10 generates contact information relating to the maintenance, the expiration date of the license, and the update of the application.

3-4. Notification Destination Selection Process

The overall management server 10 selects the notification destination of the contact information (step S205). For example, the overall management server 10 selects the notification destination according to the content of the notification. For example, the overall management server 10 selects the manager M and user U as the notification destinations of the contact information relating to maintenance, selects the user U as the notification destination of the contact information relating to the expiration date of the license, and selects the manager M as the notification destination of the contact information relating to the update of the application. In this process, the provider P can also specify the notification destination of the contact information.

3-5. Contact Information Notification Process

The overall management server 10 notifies the application server 20 of the contact information (step S206). For example, the overall management server 10 notifies the application server 20 of the contact information relating to maintenance and the contact information relating to the update of the application. Moreover, the overall management server 10 notifies the user terminal 30 of the contact information (step S207). For example, the overall management server 10 notifies the user terminal 30 of the contact information relating to maintenances and the contact information relating to the expiration date of the license.

4. Effects of Second Embodiment

Finally, effects of the second embodiment will be described. In the following, first to fourth effects corresponding to the process according to the embodiment will be described.

4-1. First Effect

First, in the process according to the embodiment described above, on the basis of the type of notification, at least one of the manager M and the user U is notified. Therefore, in the present process, by sending information urgently, instantaneously, and widely, it is possible to effectively manage applications per user.

4-2. Second Effect

Second, in the process according to the embodiment described above, when there is a failure in running the application, the manager M and the user U are notified of the maintenance information relating to the maintenance corresponding to the failure. Therefore, in the present process, by sending information urgently, instantaneously, and widely to the manager M and the user U, it is possible effectively manage applications per user.

4-3. Third Effect

Third, in the process according to the embodiment described above, the user U is notified of information urging the user U to update the license, before a predetermined period of the expiration date of the license of the application used by the user U. Therefore, in the present process, by sending information urgently, instantaneously, and widely to the user U, it is possible to effectively manage applications per user.

4-4. Fourth Effect

Fourth, in the process according to the embodiment described above, the manager M is notified of information relating to the update of the application managed by the manager M. Therefore, in the present process, by sending information urgently, instantaneously, and widely to the manager M, it is possible to effectively manage applications per user.

Others

Some examples of combinations of the disclosed technical features will be described below.

System

The processing procedures, control procedures, specific names, and information including various types of data and parameters illustrated in the above documents and drawings may be optionally changed unless otherwise specified.

Moreover, each component of each device illustrated in the drawings is functionally conceptual and need not necessarily be physically configured as illustrated in the drawings. That is, the specific modes of distribution and integration of the devices are not limited to those illustrated in the drawings. In other words, all or part of the devices can be functionally or physically distributed or integrated in an optional unit according to various loads and the state of use.

Moreover, all or an optional part of various processing functions performed by each device can be implemented by a CPU and a computer program that is analyzed and executed by the CPU, or by hardware using wired logic.

Hardware

Figure 11:
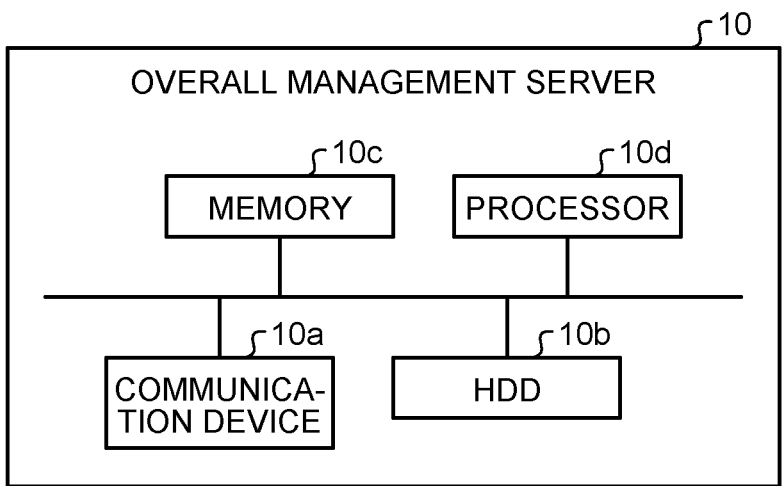
FIG. 11 is a diagram for explaining a hardware configuration example.

Next, a hardware configuration example of the overall management server 10 that is the information providing device will be described. Other devices such as the application server 20 may also have the same hardware configuration. FIG. 11 is a diagram for explaining a hardware configuration example. As illustrated in FIG. 11, the overall management server 10 includes a communication device 10a, a Hard Disk Drive (HDD) 10b, a memory 10c, and a processor 10d. Moreover, the units illustrated in FIG. 11 are connected to each other via a bus or the like.

The communication device 10a is a network interface card or the like, and communicates with other servers. The HDD 10b stores a computer program and DB that operate the functions illustrated in FIG. 2.

The processor 10d reads a computer program that executes the same processing as that of each processing unit illustrated in FIG. 2 from the HDD 10b or the like, and expands the read computer program in the memory 10c. Then, the processor 10d operates a process of executing the functions described in FIG. 2 and the like. For example, this process performs the same function as that of each processing unit in the overall management server 10. Specifically, the processor 10d reads a computer program having the same functions as the acquisition unit 13a, the setting unit 13b, the providing unit 13c, the collection unit 13d, the generation unit 13e, the notification unit 13f, and the like, from the HDD 10b and the like. Then, the processor 10d executes a process that executes the same process as the acquisition unit 13a, the setting unit 13b, the providing unit 13c, the collection unit 13d, the generation unit 13e, the notification unit 13f, and the like.

In this manner, the overall management server 10 operates as a device that performs various processing methods by reading and executing a computer program. Moreover, the overall management server 10 can implement the same function as the embodiment described above, by reading the computer program described above from the recording medium by a medium reading device, and executing the read computer program. The computer program in the other embodiment is not limited to being executed by the overall management server 10. For example, the present invention can be similarly applied to a case where another computer or server executes the computer program or when the other computer and server cooperate with each other to execute the computer program.

The computer program can be distributed via a network such as the Internet. Moreover, the computer program can be recorded on a computer-readable recording medium such as a hard disk, a flexible disk (FD), a CD-ROM, a Magneto-Optical disk (MO), and a Digital Versatile Disc (DVD), and executed by being read out from the recording medium by a computer.

What is claimed is:

1. An information providing device, comprising:
   a processor configured to execute a process that includes:
   responding to a request to use an application from a first user;
   setting a management area for running the requested application, for the first user; wherein the management area is allocated with a divided resource of a cloud system;
   generating, within the management area, a plurality of areas corresponding to a status of a second user, by dividing the management area set for the first user;
   installing each of a plurality of applications that make up the requested application in each of the plurality of areas; and
   providing the requested application to the management area set for the first user.

2. The information providing device according to claim 1, wherein the processor is configured to execute the process that further includes:
   generating the management area allocated with the divided resource of the cloud system that provides a cloud environment, and
   installing at least one of the plurality of applications on a virtual machine generated as an information management device using the resource allocated to the management area.

3. The information providing device, according to claim 1, wherein the processor is configured to execute the process that further includes:
   installing each of the plurality of applications requested by the first user, on each of a plurality of information management devices built in each of the plurality of areas.

4. The information providing device according to claim 1, wherein the processor is configured to execute the process that further includes, based on a type of notification, notifying at least one of the first user and the second user.

5. The information providing device according to claim 4, wherein the processor is configured to execute the process that further includes, when there is a failure in running the requested application, notifying at least one of the first user and the second user of maintenance information relating to maintenance corresponding to the failure.

6. The information providing device according to claim 4, wherein the processor is configured to execute the process that further includes, before a predetermined period of an expiration date of a license of the requested application used by the second user, notifying the second user of information urging the second user to update the license.

7. The information providing device according to claim 4, wherein the processor is configured to execute the process that further includes notifying the first user of information relating to update of the requested application managed by the first user.

8. A method comprising:

responding to a request to use an application from a first user;

setting a management area for running the requested application, for the first user, wherein the management area is allocated with a divided resource of a cloud system;

generating, within the management area, a plurality of areas corresponding to a status of a second user, by dividing the management area set for the first user;

installing each of a plurality of applications that make up the requested application in each of the plurality of areas; and providing the requested application to the management area set for the first user.

9. The method according to claim 8, wherein the divided resource is allocated based on a request of an agency, wherein the agency manages the management area.

10. The method according to claim 8, wherein the plurality of applications installed in each of the plurality of areas are the same.

11. The method according to claim 8, wherein at least two of the plurality of applications installed in the plurality of areas are different from each other.

12. The method according to claim 8, further comprising granting the first user use authority to use at least one of the plurality of applications.

13. The method according to claim 12, wherein the use authority comprises a usable range of the at least one of the plurality of applications.

14. The method according to claim 13, wherein the usable range includes at least one of the following: number of available screens, number of allowed users, and number of accessible data.

15. The method according to claim 8, further comprising generating a plurality of notifications to at least one of the first user and the second user.

16. The method according to claim 15, further comprising displaying the management area and the plurality of areas in a selectable manner and at least one of a list of the first user and the second user of the requested application provided in a selected management area and an input screen of a status to be notified to at least one of the first user and the second user selected from the list, and sending the notifications to at least one of the first user and the second user, wherein the notifications include the status.

17. A computer-readable recording medium having stored therein an information providing program that causes a computer to execute a process comprising:

responding to a request to use an application from a first user;

setting a management area for running the requested application, for the first user, wherein the management area is allocated with a divided resource of a cloud system;

generating, within the management area, a plurality of areas corresponding to a status of a second user, by dividing the management area set for the first user;

installing each of a plurality of applications that make up the requested application in each of the plurality of areas; and providing the requested application to the management area set for the first user.

* * * * *